United States Patent [19]

Withers

[11] Patent Number: 5,299,468
[45] Date of Patent: Apr. 5, 1994

[54] ELASTOMERIC VIBRATIONAL DAMPERS

[76] Inventor: Graham R. Withers, 1297 Nepean Highway, Cheltenham, Victoria 3192, Australia

[21] Appl. No.: 671,912
[22] PCT Filed: Aug. 6, 1990
[86] PCT No.: PCT/AU90/00334
  § 371 Date: May 1, 1992
  § 102(e) Date: May 1, 1992
[87] PCT Pub. No.: WO91/02176
  PCT Pub. Date: Feb. 21, 1991

[30] Foreign Application Priority Data

Aug. 4, 1989 [AU] Australia ............... PJ 5617
Oct. 6, 1989 [AU] Australia ............... PJ 6760

[51] Int. Cl.⁵ ............................................. F16F 15/12
[52] U.S. Cl. ......................................................... 74/574
[58] Field of Search .................. 74/574; 188/378, 379; 464/180

[56] References Cited

U.S. PATENT DOCUMENTS 1,944,233 1/1934 Hann ............................................. 74/6
2,594,555 4/1952 Hardy ......................................... 74/574
4,710,152 12/1987 Ichikawa et al. .................. 74/574 X

FOREIGN PATENT DOCUMENTS 255913  8/1963  Australia .
247489 10/1963  Australia .
578170 10/1988  Australia .
578846 11/1988  Australia .
83399/87 4/1990  Australia .
527197  7/1956  Canada ............................ 74/574
2250890 10/1972 Fed. Rep. of Germany ........ 74/574
58-14678 9/1983 Japan .
820042  9/1959  United Kingdom .
896548  5/1962  United Kingdom .
1011363 11/1965 United Kingdom .

Primary Examiner—Allan D. Herrmann
Attorney, Agent, or Firm—Mason, Fenwick & Lawrence

[57] ABSTRACT

An elastomeric damper comprises a hub section configured for connection to a rotational shaft requiring damping in an internal combustion engine, and an inertia ring fitted within the hub section. The hub section includes a central region, an annular radially extending section extending radially outwardly from the central region, and an annular axially extending section extending axially with respect to the radially extending section. The axially extending section includes a radially inwardly directed portion. An annular inertia ring is located inwardly of the axially extending section, and an elastomeric material is located between the outer circumferential surface of the inertia ring and the inner circumferential surface of the axially extending section, the radially inwardly directed portion of the axially extending portion having a length terminating radially inwardly of the outer circumferential surface of the inertia ring, so that the inertia ring is retained between the radially inwardly directed portion and the radially extending section.

10 Claims, 3 Drawing Sheets

ELASTOMERIC VIBRATIONAL DAMPERS

BACKGROUND OF THE INVENTION

1. Field of the Invention

The present invention relates to vibration dampers particularly for use on engines or transmissions adapted to drive motor vehicles.

2. Related Art

Internal combustion engines experience torsional vibrations due to non uniform loading of the crankshaft from the cylinder pressure and the reciprocating parts of the engine. If the vibration becomes severe enough to damage the crankshaft or the accessories driven by the crankshaft, either the crankshaft must be redesigned or a method of controlling the vibration must be used. Elastomeric dampers may be used to reduce torsional, axial or bending vibration to an acceptable level. Elastomeric dampers behave like a combination of a tuned absorber and an energy dissipator. The tuning effect of the damper is achieved by the proper balance of elastomer stiffness and the inertia of the damper ring, while the energy dissipation is primarily determined by the inherent damping of the elastomer. Typically the damper may include a hub part adapted to be rigidly attached to the rotational shaft requiring damping, an outer inertia ring and an elastomeric material ring separating the ineretia ring from the hub part. An example of the foregoing type of vibrational damper is shown in Australian Patent Application No. 83399/87. Other examples are shown in Australian Patent Nos. 578170, 578846, 63868/86, 255913 and U.S. Pat. Nos. 1,944,233 and 4,710,152. There is also a growing tendency to drive vehicle accessories off the crankshaft of engines and when an elastomeric damper is mounted thereon, it is necessary to drive the accessories from the intertia ring of the damper. The foregoing would not apply where the shaft requiring balancing is in the transmission. This, to some extent has some disadvantageous effects on the performance of the damper.

SUMMARY OF THE INVENTION

The aim of the present invention is to provide improved designs of elastomeric dampers capable of damping torsional vibrations or torsional and bending vibrations which may be produced efficiently and which are safe and effective in operation. A further preferred aim of the invention is to provide a damper construction that enables accessories to be driven therefrom but which separates the vibration control function from the accessories drive function.

In accordance with a first aspect of the present invention there is provided an elastomeric damper comprising a hub section adapted for connection to a rotational shaft requiring balancing in an internal combustion engine, said hub section including a radially extending portion and an axially extending portion adjacent said radially extending portion, an annular inertia ring located inwardly of said axially extending portion and an elastomeric material arranged between an outer circumferential surface of said inertia ring and an inwardly directed circumferential surface of said axially extending portion, and a radially inwardly deformed section located on said axially extending portion at a position spaced from said radially extending portion clamping said inert ring in position separated from said hub section by said elastomeric material. Conveniently said hub section is formed by pressing, rolling or otherwise deforming material (preferably steel) plate.

In accordance with a second aspect of the present invention there is provided an elastomeric damper comprising a hub section adapted for connection to a rotational shaft requiring balancing in an internal combustion engine, said hub section including a radially extending portion and an axially extending portion adjacent said radially extending portion, an annular inertia ring located inwardly of said axially extending portion and an elastomeric material arranged between an outer circumferential surface of said inertia ring and an inwardly directed circumferential surface of said axially extending portion, said elastomeric material being preformed to include an axially extending part and at least one radial extending part located between the inertia ring and the radial extending portion of said hub section. Preferably, the elastomeric material is bonded to said inertia ring and said hub section.

In accordance with a third aspect of the present invention, there is provided an elastomeric damper comprising a hub section adapted for connection to a rotational shaft requiring balance in an internal combustion engine, said hub section including a radially extending portion and an axially extending portion adjacent said radially extending portion, a first annualar inertia ring located inwardly of said axially extending portion and an elastomeric material arranged between an outer circumferential surface of said first inertia ring and an inwardly directed circumferential surface of said axially extending portion, a second annular inertia ring located inwardly of said axially extending portion of said hub section between said first inertia ring and said radially extending portion, elastomeric material located between said first and second inertia rings and between said second inertia ring and said radially extending portion of the hub section.

Preferably, a radially inwardly deformed section located on said axially extending portion at a position spaced from said radially extending portion is provided with elastomeric material being located between said inwardly deformed section and said first inertia ring. In another preferred arrangement at least part of the aforesaid elastomeric material is formed by a preferred annular ring having an axially extending part and at least one radially extending part located between the first inertia ring and the radially extending portion of the hub section.

In accordance with a still further aspect, the present invention comprises providing an elastomeric damper comprising a hub section adapted for connection to a rotational shaft requiring balancing in an internal combustion engine, an inertia ring and an elastomeric material separating said inertia ring from said hub section, said hub section being manufactured from formed metal plate. Conveniently, the inertia ring is also manufactured from formed metal plate, with at least one (or both) of said inertia ring and said hub section having an axially extending section connected to a radially extending section, a free end of the or each said axially extending section being deformed radially to prevent axial relative movement between said hub section and said inertia ring.

According to a still further aspect, the present invention also provides an elastomeric damper comprising a hub section adapted for connection to a rotational shaft requiring balancing in an internal combustion engine and an annular damper section located radially outwardly of the hub section, said damper section having an axially extending annular part rigidly connected to said hub section, an annular inertia ring located inwardly of said axially extending portion and an elastomeric material located between an outer circumferential surface of said inertia ring and an inwardly directed circumferential surface of said axially extending portion. Conveniently, the damper section is formed by at least two discs of rolled, pressed or otherwise deformed metal plate to form an annular partially or wholly enclosed space housing the inertia ring. Preferably the at least two parts forming the annular space housing the inertia ring may be extended to the hub section. The elastomeric material might be a preformed ring or rings or might be introduced into the space surrounding the inertia ring in a liquid or flowable condition and set therein to provide the required elastomeric material.

In accordance with another aspect of the present invention, there is provided an elastomeric damper including a hub section defining an axial extending annular rim part, an annular inertia ring and an elastomeric material separating the axial extending ring part from the inertia ring, said hub section being characterised by a convex frusto conical portion configured to fit within an annular connecting member adapted to engage a rotational shaft to be dampened by said damper, said connecting member having a concave frusto conical region co-operable with the convex frusto conical portion of the hub section and fastener means for securing said hub section to said shaft. Conveniently one or more co-operable projections and complementary recesses are provided between the connecting member and the hub section to minimize or prevent relative rotation between these parts.

Conveniently, in any or all of the foregoing arrangements the outer surface of the axially extending portion may include grooves adapted to engage with belt drive means for driving vehicle accessories.

BRIEF DESCRIPTION OF THE DRAWINGS

Preferred embodiments of the present invention will hereinafter be described with reference to the accompanying drawings, in which.

DETAILED DESCRIPTION OF THE PREFERRED EMBODIMENTS

Figures 1, 1A:
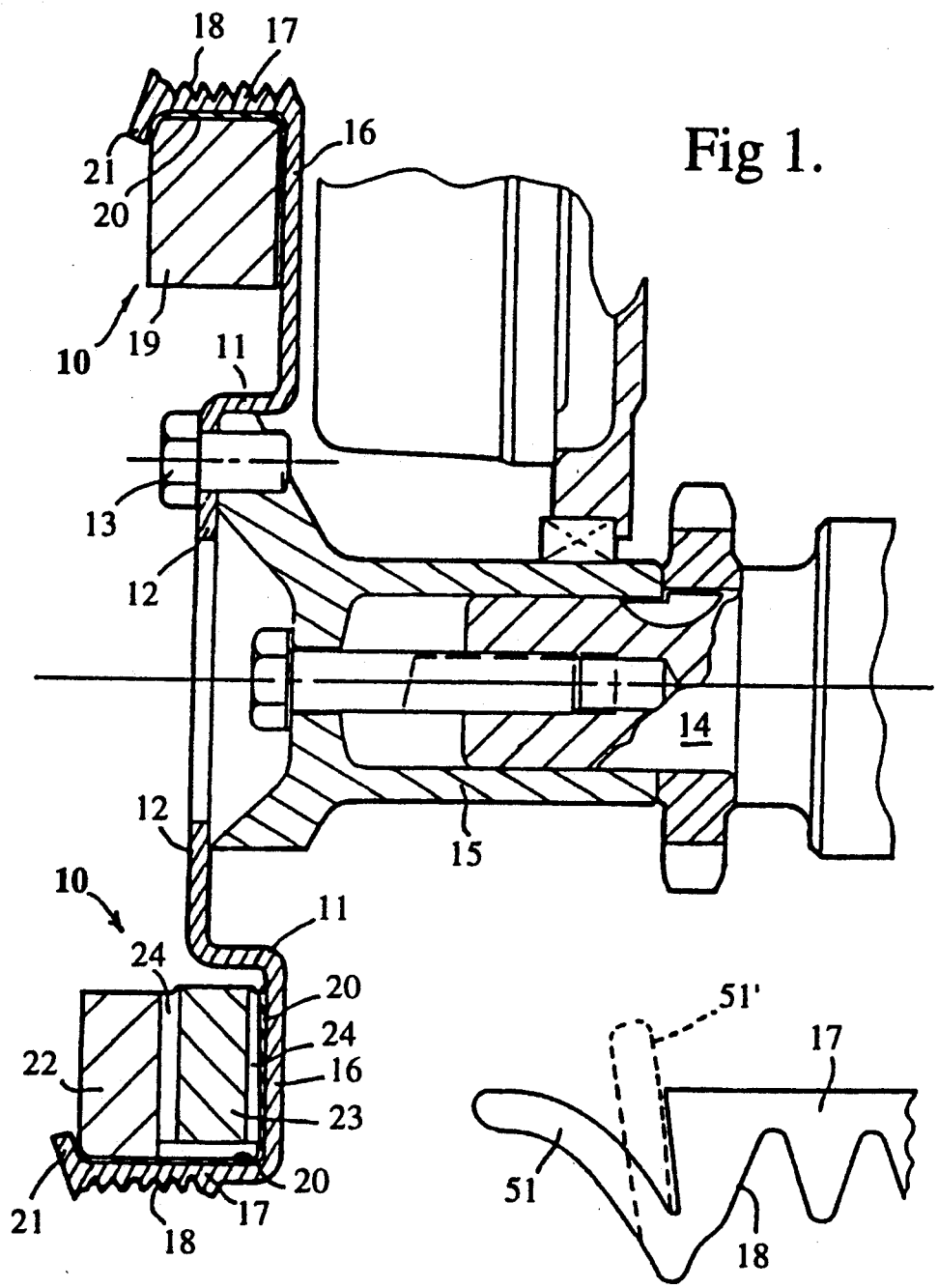
FIG. 1 is an axial cross-sectional view of an elastomeric damper according to the present invention with one preferred embodiment illustrated in the upper half and a second preferred embodiment illustrated in the lower half of the drawing.
FIG. 1A is a partial sectional view of an end portion of the rim part of the hub showing an alternative embodiment.

Referring to FIG. 1, the elastomeric damper 10 comprises a hub section 11 formed by pressing a metal (preferably steel) plate. The hub section 11 includes a central region 12 including a plurality of openings enabling suitable bolts 13 to connect the hub section to a crankshaft 14. In the embodiment illustrated an intermediary mounting member 15 is used, however, if space permits in the engine cavity the central region 12 may connect directly to the crankshaft end.

Referring to the upper half of FIG. 1, the hub section 11 includes a radially extending section 16 and an axially extending section 17 extending from the outer end of the radially extending section 16. The outer surface of the axially extending section 17 which may include a plurality of V Grooves 18 (or the like) formed by any suitable means such as machining, pressing, rolling or any similar technique to enable accessories to be driven by a belt drive engaging the V grooves. An annular inertia ring 19 is located inwardly of the inner surface of the axially extending section 17 and is separated from the inner surface by an elastomeric material 20. The material 20 also extends down at least a short distance of the radial extending part 16 and an inwardly deformed flange 21 formed from the axially extending part so that metal to metal contact between the inertia ring 19 and the hub section 11 is prevented. Conveniently the flange 21 is deformed to the position illustrated after the inertia ring 19 has been located in the position shown.

The lower part of FIG. 1 illustrates a further preferred embodiment wherein two annular inertia rings 22 and 23 are employed. In this case the elastomeric material 20 extends over the inner surface of the flange 21, the axially extending part 17 and most of the radially extending part 16. The axially extending part 17 would normally need to be longer than the embodiment shown in the upper half of FIG. 1 to accommodate the two inertia rings. The inertia ring 22 is located adjacent the flange 21 and the inertia ring 23 is located between the ring 22 and the radially extending part 16. The ring 23 is spaced inwardly from the axially extending part and the elastomeric material 20 thereon. Conveniently an elastomeric material 24 (which may be the same composition as material 20 or different therefrom) is provided between the two inertia rings and between the second inertia ring 23 and the radially extending part 16. In this embodiment the inertia ring 22 acts to reduce torsional vibrations and the inertia ring 23 acts to reduce bending vibrations.

Reference will now be made to FIGS. 2, 2A, 2B and 2C. The elastomeric dampers 10 shown in the upper and lower halves of this drawing include inner parts that in operation are essentially similar to the dampers shown in FIG. 1. Thus, like features have been given the same reference numbers. In these embodiments, however, the outer surface of the axially extending part 17 is essentially plane and carries an elastomeric material sleeve 25. A further inertia ring member 26 is provided on the outer surface of the elastomeric material sleeve 25. This inertia ring member 26 is conveniently formed by pressing and rolling steel plate in a similar manner to the hub section 11. The member 26 includes an axially extending region 27, a radially inwardly extending flange 28 at one end of the axially extending region 27 and a rolled or otherwise deformed flange 29 located at the other end of the axially extending region 27. The outer surface of the axially extending region may include V-belt drive grooves 30 similar to 18 in the embodiment of FIG. 1. The reason for this arrangement is that elastomeric vibrational dampers cannot dampen out all vibrations although approximately 75% of the amplitude of vibrations can be removed. However, in some cases, it may not be desired to transmit such vibrations through the accessory drive as could be the case with the embodiment of FIG. 1. Providing an accessory drive from a further outer ring 26 that is separated from the hub by an elastomeric material 25 that is very much softer than the elastomeric materials 20, 24 will have the tendency of preventing the transmission of such vibrations that might remain to the accessory drive.

Figure 2A:
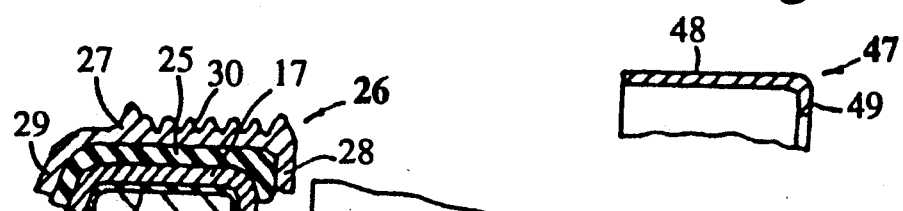
FIG. 2A shows in partial section one possible preferred form of a preformed section of elastomeric material for use in the embodiment shown in the upper half of FIGS. 1 and 2.
Figure 2:
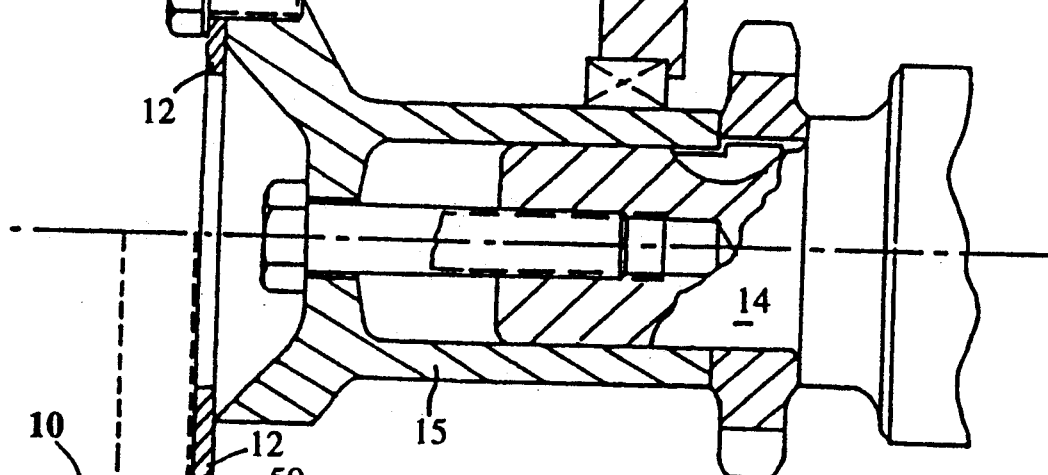
FIG. 2 is a view similar to FIG. 1 showing further preferred embodiments.
Figure 2B:
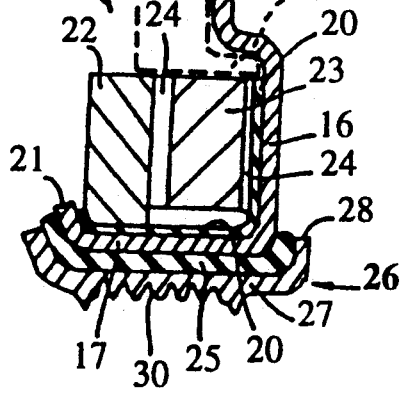
FIG. 2B shows in partial section one possible preferred form of a preformed section of elastomeric material for use in the embodiments shown in the lower half of FIGS. 1 and 2.
Figure 2C:
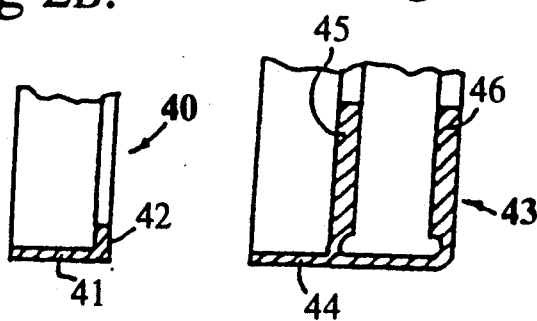
FIG. 2C shows in partial section one possible form of preferred preformed elastomeric material for use in the embodiments shown in the lower half of FIGS. 1 and 2.

Various alternatives for the elastomeric materials are illustrated in FIGS. 2A, 2B and 2C. In FIG. 2B a preformed annular ring 40 is provided having an axially extending part 41 and an inwardly directed flange 42 that is adapted to rest against an inner face of the inertia ring 22 when assembled. The axial part 41 of the ring 40 is larger than the axial length of the outer circumferential surface of the ring 22 so that when the flange 21 is deformed inwardly the elastomeric material of the ring 40 is retained between the flange 21 and the inertia ring 22. In this embodiment, separate rings of elastomeric material 24 may be used. FIG. 2C shows an alternative embodiment for an elastomeric material ring 43 having an axial section 44 and two spaced radially extending parts 45 and 46. The parts 45, 46 are adapted to form the elastomeric material 24 and the axial part 44 forms the elastomeric material 20. FIG. 2A shows a further preformed elastomeric material ring 47 having an axial part 48 and a radial flange 49 which is capable of use in the embodiments shown in the upper halves of FIGS. 1 and 2. In these embodiments the ring (or rings) is/are placed into the inertia ring (or rings) prior to assembly with the radial extending flange (or flanges) being located between the outer inertia ring and the radial part 16 of the hub. A suitable bonding agent may be applied to appropriate mating surfaces where elastomeric material contacts metal prior to assembly of same. Conveniently the binding agent is a heat activated bonding material. Conveniently the respective parts of the damper, once assembled, are held in their correct positions by the deformed flange 21 or the flanges 21, 29 and thereafter the bonding agent is activated by heat treatment. If considered necessary, particularly with the embodiment shown in the lower halves of FIGS. 1 and 2, a removable annular wedge element 50 might be used to hold the inertia rings 22, 23 in correct position during heat treatment of the bonding agent, or perhaps during deformation of the flange 21 or the flanges 21, 29.

The deformable flanges 21, 29 might be simply an end part of the axially extending portions 17 of the hub. FIG. 1A, however, illustrates one preferred arrangement where an end tab member 51 might be provided which could be formed by a metal rolling technique simultaneously with rolling of the grooves 18. Such a tab member 51 would be readily deformed to the position 51' shown in dashed outline after insertion of the inertia rings and preformed elastomeric material place on the inertia rings, into the hub member. Another alternative might be to machine an end tab member similar to that shown in co-pending Australian Patent Application No. 83399/87, although this may be relatively more expensive. In some situations, it may be considered satisfactory to not provide any deformed tab member, flange or the like and simply rely on bonding the elastomeric material to the metal parts. This arrangement is also considered to be within the scope of the present invention. In some situations, it might also be considered appropriate to provide some mechanical treatment of the metal surfaces such as knurling or axially/circumferential splining to help retain the metal and elastomeric parts in correct position during operation of the damper. Preferred manufacturing methods that may be employed are as follows. The outer drive flange and rim may be blanked and formed from rolled sheet steel. The Poly "V"ee grooves 18 are roll formed if desired. The hub section 12 can be permanently attached or adhered by means such as welding, brazing, crimping, rolling, swagging, bonding, chemical adhesives, laminating etc.

The hub may be attached by means of fixed or removable fasteners such as central bolt or bolts, screws, rivets etc., and be formed by methods such as hot forging.

The intertia rings or weights 19, 22 or 23 may be produced from rolled steel bar or continuous strip in the hot or cold state by mechanical means, by forming into a circular ring or annular, and butt joint welded or adhered. The peripheral diameter can be rapidly sized by mechanical force or by removal of metal by methods such as centreless grinding, machining, finishing, to an accurate size and surface finish.

The elastomeric member may be produced from natural or synthetic rubber, polymers, or blends thereof. The manufacturing process can be from continuously extruded strip, which is dropped and glued or by compression moulding. Bonding agents may be applied to the elastomeric members by hot airless spray coating. A post vulcanisation bonding process can be used which also acts as a post vulcanisation cure process, desirable for optimizing lifecycle properties.

It will be appreciated from the embodiments illustrated that the damper 10 can be produced economically using plate pressing or rolling techniques with a minimum of machining requirements. The inertia rings 19, 22 and 23 are all simple annular shapes without any need for expensive machining. The assembly technique of using the deformable flanges 21 and 29 ensure that the products perform satisfactorily and safely, that is they prevent separation of the hub section from the inertia rings. Moreover, several of the damper embodiments allow for selecting differing elastomeric materials and differing inertia ring masses to provide greater flexibility of the performance characteristics of the damper.

Figure 3:
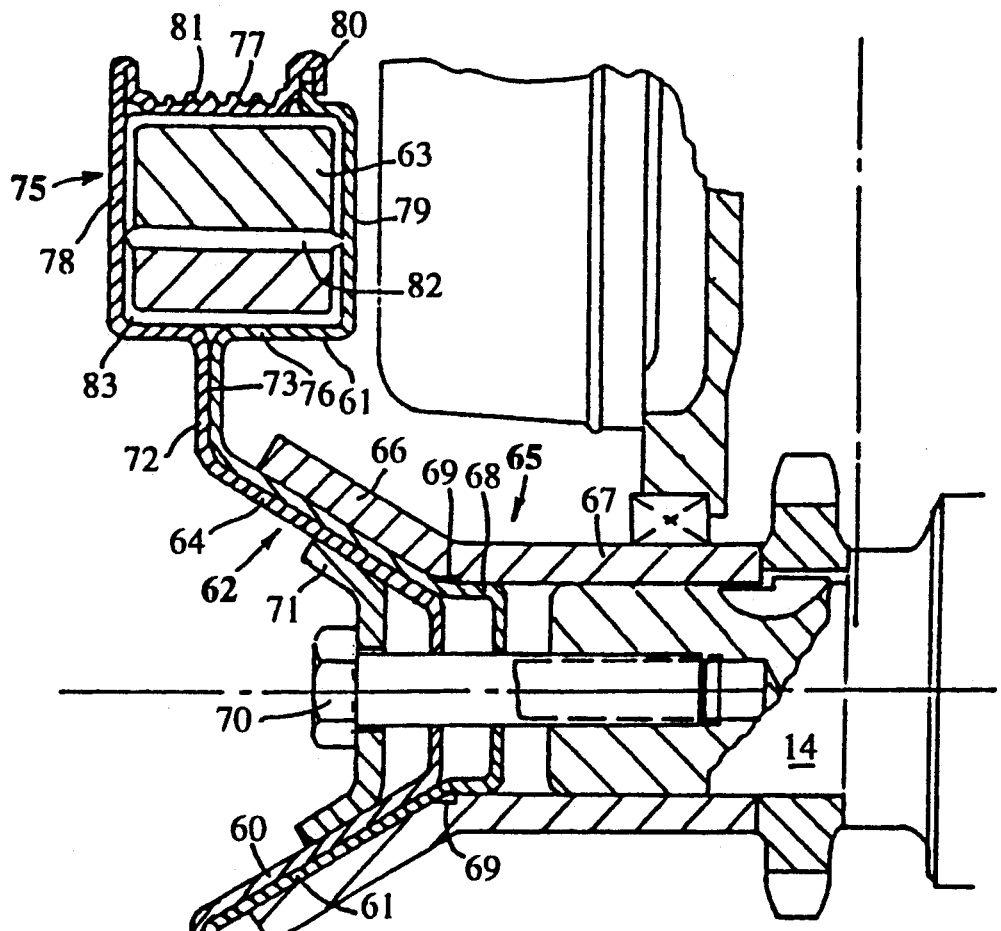
FIG. 3 is a longitudinal cross-sectional view of a damper constructed according to a still further preferred embodiment of the present invention.

Referring now to FIG. 3, the damper illustrated is formed by two plate members 60, 61 that have been rolled, pressed or otherwise formed into the desired shape as illustrated. The damper includes a hub section 62 adapted to be connected to a crankshaft 14 or the like and an inertia ring 63 enclosed within an outer annular space defined by radially outer parts of the members 60, 61. The hub section 62 is formed to have a convex frusto conical zone 64 that fits within a concave frusto conical zone 66 of a connecting member 65. The connecting member 65 has a cylindrical section 67 that fits over the crankshaft end 14. The inner member 61 may have an inner end 68 that is conformed to fit within the cylindrical section 67 of the connecting member 65. This inner end 68 may have one or more radially deformed elements adapted to fit within recesses in the inner surface of the connecting member 65 as shown at 69 to prevent relative rotation between the respective parts. A single bolt 70 with a frusto conical washer 71 is provided to secure the damper assembly hub section 62 to the shaft 14. The frusto conical configuration as shown provides a secure wedging effect to prevent the bolt 70 from loosening during operation.

Figure 3A:
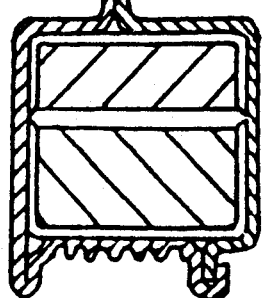
FIG. 3A is a detailed sectional view of an alternative construction of the flange marked A in FIG. 3.
Figure 3B:
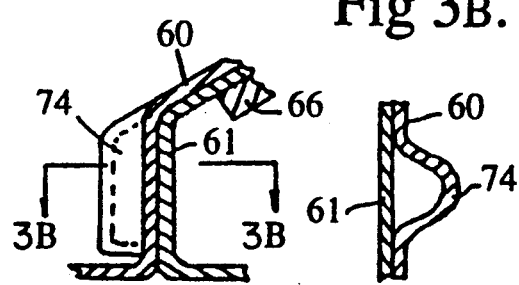
FIG. 3B is a cross-sectional view along line 3B—3B of FIG. 3A.

At the outer ends of the frusto conical zone 64, the members 60, 61 merge into a radial extending flange region 72. In this region the members 60, 61, might, after assembly, be spot welded at one or more locations 73 to secure the members together. Any other technique adapted to automatic assembly procedures might also be used such as gluing. This radial flange region 72 might, if necessary, be stiffened by the use of a plurality of radially extending stiffening ribs 74 formed in at least one of the members 60, 61 as shown in FIG. 3A and 3B.

At the outer end of the radial flange section 72, the two members diverge at right angles from the section 72 to thereafter form a substantially enclosed annular chamber 75 housing the inertia ring 63. The chamber 75 includes inner and outer axial walls 76, 77 and two spaced radial walls 78, 79. Conveniently the free ends of the members 60, 61 may be formed by a rolled connection as shown at 80. Preferably the outer surface of the outer axial extending wall 77 includes rolled grooves 81 to enable an accessory drive belt to be driven therefrom. As is shown in FIG. 3, the inertia ring 63 may be secured in position within chamber 75 by a plurality of removable pins passed axially through bores 82 in the inertia ring and the radial walls 78, 79 of the chamber 75. In such a position the ring might be held securely and elastomeric material 83 can be introduced into the surrounding cavity while in a flowable condition and set in the cavity as illustrated. The securing pins are then removed from the bores 82 to provide the finished damper. Alternatively, preformed elastomeric material rings might be used placed around the intertia ring 63 prior to assembly of the members 60, 61 as illustrated. The closed construction of FIG. 3 does tend to protect the elastomeric material from possible contamination.

It should of course be appreciated that variations within the scope of this invention are anticipated. For example, the joining point 80 for the members 60, 61 could be varied along either of the faces 78, 79 if desired. Alternatively, the end of member 61 might extend axially across the outer surface of the elastomeric material, that is between the elastomeric material and the member 60. This will prevent any internal ripples caused by rolling the grooves 81 from contacting the elastomeric material. In a further embodiment, the radial flange section 72 might be extended radially outwardly with the ends of the members 60, 61 extending in opposite directions in a T configuration. In such an arrangement, two inertia rings one on either side of the flange section 72 could be employed. In this configuration, the ends of the members 60, 61 might be rolled or otherwise deformed inwardly to prevent the respective inertia rings coming loose. In addition to the foregoing, it is also proposed to employ two inertia rings within the chamber 75, each being separated by elastomeric material. The elastomeric material might, in such arrangements extend radially as is the case in the embodiment shown in the lower half of FIG. 1 or may extend axially.

The arrangement thus described can be readily produced by inexpensive metal forming and assembly techniques and therefore a relatively inexpensive but extremely safe and reliable damper can be achieved.

I claim:

1. An elastomeric damper comprising:
a hub section configured for connection to a rotational shaft requiring damping in an internal combustion engine, said hub section including a central region, an annular radially extending section extending radially outwardly from said central region of said hub section, and an annular axially extending section extending axially with respect to said radially extending section, said axially extending section having an inner circumferential surface and an annular, radially inwardly directed portion projecting radially inwardly;
an annular inertia ring located inwardly of said axially extending section, said inertia ring having an outer circumferential surface; and
an elastomeric material located between said outer circumferential surface of said inertia ring and said inner circumferential surface of said axially extending section, said radially inwardly directed portion of said axially extending portion having a length terminating radially inwardly of said outer circumferential surface of said inertia ring, said inertia ring between retained between said radially inwardly directed portion and said radially extending section.

2. An elastomeric damper according to claim 1 wherein said hub section is formed primarily by a metal deforming process from sheet metal, said metal deforming process including rolling or pressing.

3. An elastomeric damper according to claim 1 wherein said inertia ring means is formed by at least two individual inertia ring members, said inertia ring members being separated by elastomeric material.

4. An elastomeric damper according to claim 3 wherein the elastomeric material located between said inertia ring members extends radially.

5. An elastomeric damper according to claim 3 wherein the elastomeric material located between said inertia ring members extends in an axial direction.

6. An elastomeric damper according to claim 1 wherein said hub section is formed by two plates of sheet metal formed by metal deforming processes.

7. An elastomeric damper according to claim 6 wherein said inertia ring means is located within a retaining annular container, said container being formed in part by both said plates, said elastomeric material being located at least between said inertia ring means and at least part of each wall forming said annular container.

8. An elastomeric damper according to claim 6 wherein said axially extending annular part is formed with a central radially inwardly directed portion adapted to connect to said hub section, said inertia ring means being formed by an inertia ring member located on each side of said radially inwardly directed portion.

9. An elastomeric damper according to claim 1 wherein said axially extending section is integrally formed with said radially extending section, and said radially extending section is integrally formed with said central region.

10. An elastomeric damper according to claim 1, wherein said axially extending section has an outwardly facing surface and one or more drive grooves located in said outwardly facing surface.

* * * * *